March 23, 1948.          O. H. BANKER          2,438,381
LOCK-UP ONE-WAY TORSIONAL FORCE EXERTING DEVICE
Filed Feb. 25, 1946          2 Sheets-Sheet 2
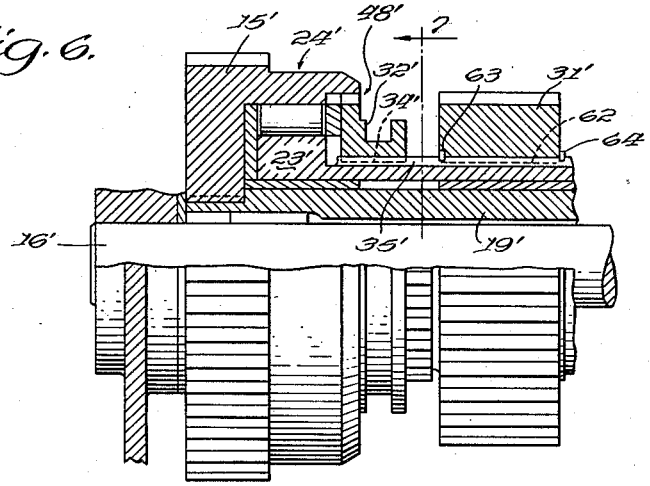
Fig. 6.
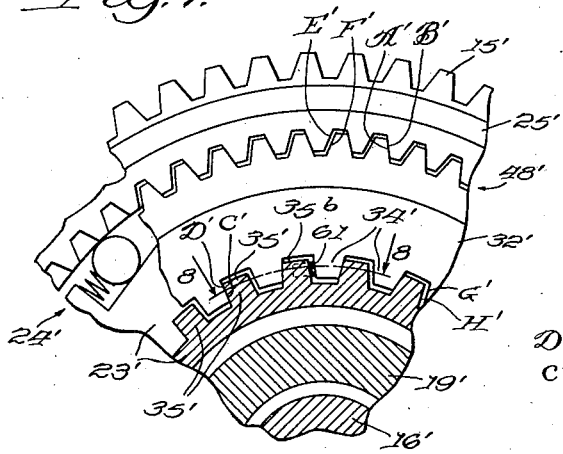
Fig. 7.
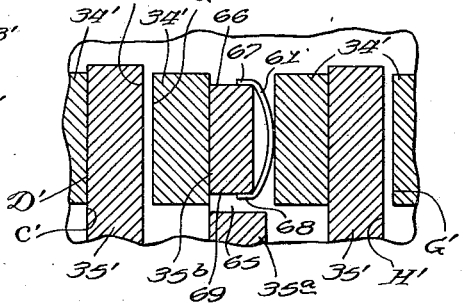
Fig. 8.
Fig. 9.
Inventor:
Oscar H. Banker.
By Stone, Artman + Bisson
Attys.

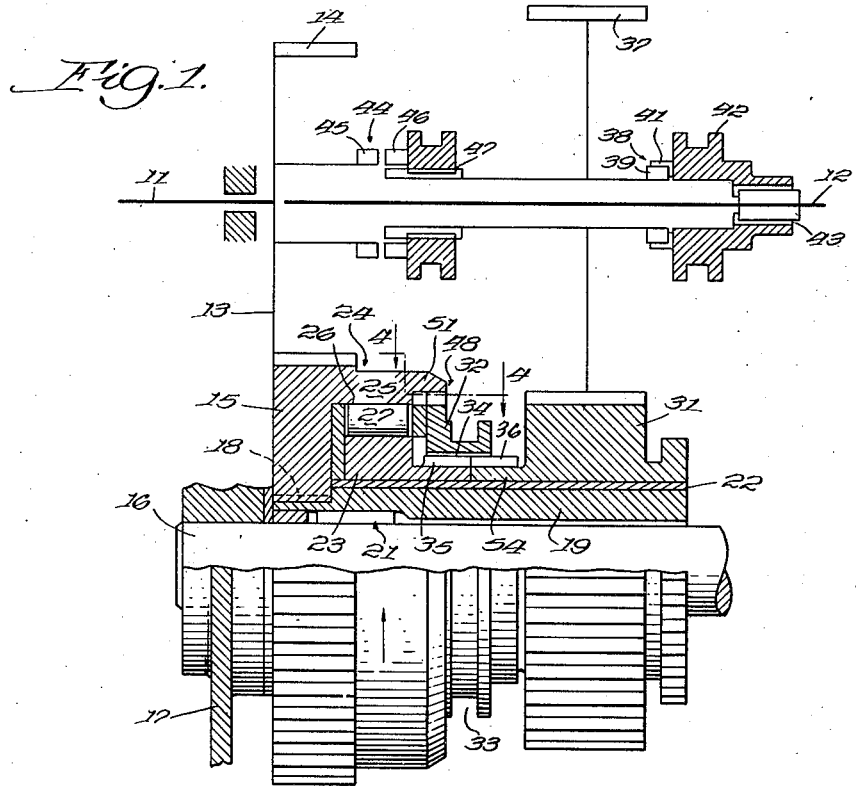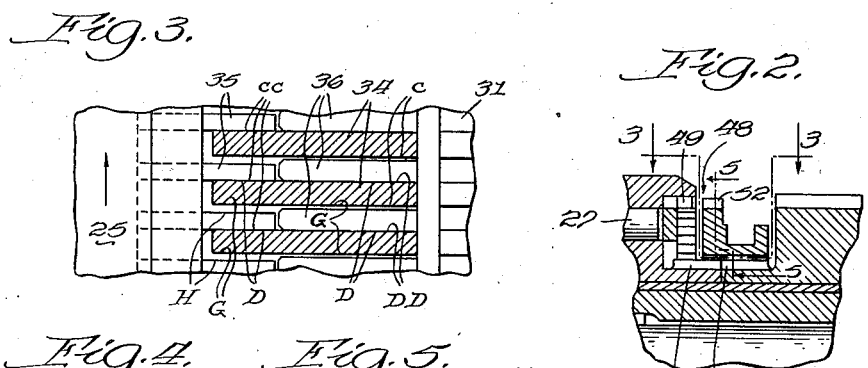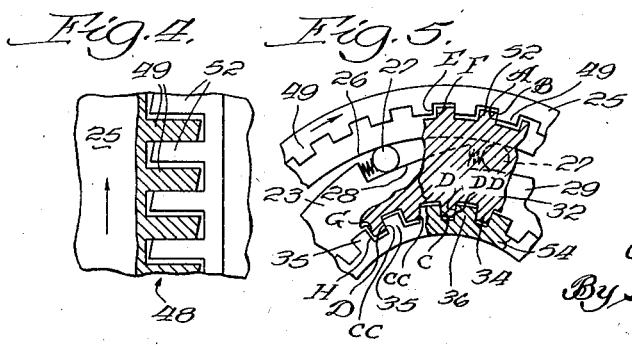

Patented Mar. 23, 1948

2,438,381

UNITED STATES PATENT OFFICE 2,438,381

LOCKUP ONE-WAY TORSIONAL FORCE EXERTING DEVICE

Oscar H. Banker, Evanston, Ill., assignor to New Products Corporation, Chicago, Ill., a corporation of Delaware Application February 25, 1946, Serial No. 649,930

9 Claims. (Cl. 192—48)

This invention concerns change-speed gearing power trains or the like having a one-way torsional force exerting device therein and relates more particularly to an improved means for locking up the device so its associated power train is divested of its overrunning character.

In some forms of automatic change-speed apparatus a lower speed transmitting power train will have associated therewith a device that enables the power train to transmit driving force in only one direction whereby such power train is adapted to overrun and thereby remain mobilized (in contrast to being established) during establishment and operation of a higher speed train between drive and driven members common to the lower speed train. There are times, however, when it is desired to circumvent this overrunning feature, as in automobile change-speed transmissions so the engine can exert braking action through the lower speed power train to the road wheels. Heretofore temporary elimination of the overrunning device has been accomplished by employing a bridging ring having a splined connection with the driven part of the device together with a jaw clutch for connecting said ring with the driving part. With this conventional lock-up bridging structure it is possible under certain circumstances to so tightly wedge the clutch teeth, pursuant to their being meshed, that it is extremely difficult to disengage the clutch.

The principal object of the invention is the provision of a lock-up structure for a one-way torsional force exerting device that is operable without the contingency of so wedging the meshable teeth thereof that it is difficult to subsequently demesh these teeth for terminating the locked-up condition. In accomplishing this object a bridging structure of the lock-up device is provided with a circumferential lost-motion connection with one element of the torsional force exerting device, and a jaw clutch having teeth components respectively constrained for rotation with the bridging structure and with the other part of the device so constructed that backlash exists between the clutch teeth when engaged, and means is provided for operation while the clutch is demeshed for effecting limited rotation of said bridging structure relatively to the one part of the device in one direction whereby a condition permitting of circumferential relative movement in a limited amount will prevail between the drive and the driven parts of the device after engagement of the clutch.

Another object of the invention is the provision of a lock-up mechanism for an overrunning clutch device and wherein there is a bridging structure having elements meshed with elements on the driven part of the device and on a coaxial member in a manner that the bridging structure is slidably adjustable axially of said part and said member while establishing a driving connection therebetween, together with a jaw clutch having toothed counterparts so disposed respectively upon the bridging structure and upon the driving part of the overrunning clutch that the clutch teeth are meshable pursuant to adjustment of the bridging structure in one axial direction, but because of the driven member being driven from the driven part of the overrunning clutch through the bridging structure, during the transmission of driving force, said meshed elements grip and resist axial adjustment of the structure and meshing of the jaw clutch teeth excepting when no force is being transmitted. This assures that the clutch will not be engaged excepting when the rotative position of the bridging structure relatively to the driven part of the overrunning clutch device is such that the engagement of the clutch cannot incur the wedged condition of its teeth.

Another object of the invention is the provision of a lock up mechanism for the above described purpose which employs spring members between the meshed elements of the bridging structure and the driven part of the overrunning clutch to urge the bridging structure rotatively relatively to the driven part, as facilitated by backlash between the meshed elements, for conditioning the bridging structure so jaw clutch counterparts respectively upon said structure and upon the driving part of the clutch will not wedge into a tight non-extractable condition pursuant to their being meshed.

These and other desirable objects inherent in and encompassed by the invention will be more clearly understood after reading the ensuing description with reference to the annexed drawings, wherein:

Fig. 1 is a partially diagrammatic view of power transmitting gear trains in one form of change-speed transmission and showing partly in elevation and partly in section a torsional force exerting device in the form of an overrunning clutch together with a lock-up mechanism therefor embodying a preferred form of the invention.

Fig. 2 is a fragmentary sectional view of the overrunning clutch and lock-up mechanism of Fig. 1 but illustrated with the lock-up mechanism in its inoperative position.

Fig. 3 is a fragmentary sectional view taken on the line 3—3 of Fig. 2.

Fig. 4 is a fragmentary sectional view taken on the line 4—4 of Fig. 1.

Fig. 5 is a fragmentary sectional view taken on the line 5—5 of Fig. 2.

Fig. 6 is an elevational view partly in section of the overrunning clutch device illustrated in Fig. 1 but having associated therewith a modified form of lock-up mechanism constituting a second embodiment of the invention.

Fig. 7 is a fragmentary sectional view taken on the line 7 of Fig. 6.

Fig. 8 is a fragmentary sectional view taken on the line 8—8 of Fig. 7.

Figure 9 is a view taken similarly to Fig. 8 illustrating a third embodiment of the invention.

With continued reference to the drawings, attention is particularly directed to Fig. 1 because of its showing an environment wherein a mechanism embodying the present invention has utility. Part of a change-speed transmission is illustrated in Fig. 1. This transmission has a drive shaft 11 diagrammatically represented by a straight line. Said drive shaft is arranged conventionally coaxially with a driven shaft 12 also diagrammatically represented by a single heavy line. Drive shaft 11 has a gear 13 constrained for rotation therewith. Teeth 14 of the gear 13 mesh with the teeth of a gear 15 which is rotatable about a countershaft supporting rod 16 having one end supported in a gear box wall 17. Countershaft gear 15 has a splined driving connection at 18 with a tubular countershaft 19. The countershaft is rotatively supported on the rod 16 by axially spaced sets 21 of bearings, one of such sets being shown.

A bearing sleeve 22 on the countershaft rotatively supports a driven part 23 of an overrunning clutch unit 24 which is a form of one-way torsional force exerting device. The driving part, 25, of the device 24 is formed integrally with the gear 15 and has a perfectly cylindrical inner periphery 26 for frictional engagement with clutch rollers 27; Figs. 1, 2 and 5. The clutch rollers are spring-urged into wedging relation between the periphery 26 and the profiles 28 of circumferentially spaced cams 29 on the outer periphery of the driven part 23. The device 24 is of conventional construction, and, any other form of overrunning clutch device may of course be substituted therefor. In the operation of this device rotation of the driving part 25 relatively to the driven part 23 in the clockwise direction as viewed in Fig. 5 is precluded by the rollers 27 wedging between the profiles 26 and 28. On the other hand, clockwise rotation of the driven part 23 relatively to the driving part releases the wedged rollers and can occur without impediment.

A driven element or gear 31 is drivable from the driven part 23 of the overrunning clutch unit 24 through a bridging structure 32. Bridging structure 32 is in the form of an axially shiftable ring having a shifter-fork groove 33. Internal spline members 34 of the bridging structure mesh with exterior spline mmebers 35 on the driven part 23 and with exterior spline members 36 on the gear 31. Counter-shaft gear 31 meshes with a gear 37 which is mounted for rotation on the shaft 12. A jaw clutch 38 is for optionally connecting the gear 37 with the shaft 12. Teeth 39 on the hub of the gear 37 constitute one counterpart of the clutch 38 while teeth 41 on an axially shiftable ring 42 constitute the other counterpart. Ring 42 has a splined connection 43 with the shaft 12.

A second jaw clutch 44 is adapted to optionally establish a driving connection between the gears 37 and 14. A toothed counterpart 45 of this clutch is meshable with a toothed counterpart 46 thereof which has a splined connection 47 with the hub of gear 37. Still another jaw clutch 48 has a counterpart of clutch teeth 49 on the inner periphery of an axially-projecting annular portion 51 of the overrunning clutch driving part 25 and a counterpart of teeth 52 on the bridging structure 32. The teeth of clutch 48 are optionally meshable and demeshable by axially shifting of the ring 32 between the positions shown in Figs. 1 and 2.

Assuming the clutch 44 to be disengaged and the clutch 38 to be engaged, as illustrated in Fig. 1, and further assuming the clutch 48 to be disengaged as illustrated in Fig. 2, driving force can be transmitted from the drive shaft 11 to the driven shaft 12 in a counter-clockwise direction, as these shafts are viewed from the right in Fig. 1. Such drive is through a relatively low speed power train comprising the gears 14 and 15, overrunning clutch device 24, the bridging structure 32, gears 31 and 37, and the clutch 38. Should it be desired to drive the driven shaft 12 at a faster speed relatively to the drive shaft 11, this can be done by interrupting the driving force applied to the drive shaft so that it and the gear 14 will decelerate while the driven shaft 12 and the load driven thereby, due to their inertia, continue to rotate without substantial abatement of speed as permitted by the overrunning clutch device 24. The teeth 46 of clutch 44 are constrained to revolve at the unabated speed of the driven shaft 12 whereas the teeth 45 of this clutch are constrained to decelerate with the drive shaft, so that ultimately the teeth 45 decelerate to synchronize with the teeth 46 whereupon clutch 44 can be engaged for establishing a direct driving connection between the shafts 11 and 12. Driving force is then transmittable from the shaft 11 to the shaft 12 through said clutch 44, the hub of gear 37 and the clutch 38, while the gears 37 and 31 are effective through the bridging structure 32 for driving the driven part 23 of the overrunning clutch at an overspeed with respect to the driving part 25. It will be noted that the establishment of the higher speed train by synchronizing and meshing the counterparts of the clutch 44 involves no disconnection of the lower speed power train, but, contrarily, this lower speed power train remains mobilized so that upon subsequent disengagement of the clutch 44 and the speeding up of the drive shaft the lower speed power train will become effective automatically for transmitting power.

During operation of the lower speed power train, the driven shaft 12 is unconstrained from rotating faster than the drive shaft so that when utilized under these conditions upon a motor vehicle the apparatus is ineffective for transmitting braking force from the vehicle engine to the load wheels. However, it is possible to convert the low speed power train into a two-way drive power train so the engine can serve as a brake or so the vehicle can be towed to transmit cranking force from the road wheels to the engine. Conversion of the overrunning power train into a two-way force transmitting power train is accomplished by axially shifting the bridging structure 32 from the Fig. 2 position to the Fig. 1 position for engaging the clutch 48.

If the gear 31 were connected rigidly with the overrunning clutch driven part 23 as by means of a sleeve upon which the splines 35 and 36 were integrally formed, in certain instances it would be possible to mesh teeth of the clutch 48 in such a fashion that the de-meshing of these teeth would be extremely difficult or impossible without dismantling parts of the apparatus. For example, if the teeth 35 and 36 were formed integrally and the bridging structure 32 was shifted to the left for engaging the clutch 48 while power was being transmitted through the overrunning clutch device from the drive shaft to the driven shaft and it also happened that the teeth 52 were in such a circumferential position relatively to the teeth 49, as illustrated in Fig. 5, that faces A of the teeth 52 wedge or slide tightly against faces B of the teeth 49, pursuant to clutch engagement, as the faces A slide hard against the faces B there would be a reactive force through the structure 32 causing faces C of teeth 34 to slide hard against opposed faces of the splines meshed therewith, so the structure would lodge tightly between the latter-named spline faces and the faces B, making it impossible to dislodge or disengage the clutch. This wedged condition could not be alleviated by rotating the clutch driving part 25 clockwise relatively to the driven part 23 as viewed in Fig. 5, because of the rollers 27 being wedged between the peripheries 26 and 28. Termination of the wedged condition could not be accomplished by rotation of the clutch driving part 25 in the counter-clockwise direction relatively to the driven part 23 because such tendency would simply increase the force between the teeth faces A and B and between the faces C of the bridging member splines 34 and the opposed faces of the splines meshed therewith.

In the present arrangement, the possibility of incurring the just-described wedged locking of the bridging structure is avoided because the gear 31 and the driven part of the overrunning clutch are capable of limited relative rotation during operation of the lower speed train. This limited relative rotation is possible principally because the internal splines 34 of the bridging structure 32 have spaces therebetween in excess of the breadth of the teeth 35 as illustrated in Figs. 3 and 5. Only a slight backlash exists between the teeth 36 and 34, as illustrated in Fig. 3, this backlash needing to be only sufficient to provide for freedom of axial movement of the bridging structure relatively to the teeth 36. Also as illustrated in Figs. 4 and 5, backlash is provided between the teeth of the lock-up jaw clutch 48.

When it is desired to close the lock-up clutch 48, the clutch 44 will be disengaged and normally the transmission of driving force from the drive shaft to the driven shaft through the low-speed overrunning power train will be interrupted. Under these conditions, because of the inertia of the driven shaft and the load connected therewith, the gear 31 and its hub 54 carrying the splines 36 will have a tendency to rotate clockwise as viewed in Fig. 5 at greater speed than the bridging structure 32 or either part of the overrunning clutch device. Consequently, the gear hub 54 will have a tendency to rotate the bridging structure 32 clockwise and this bridging structure will in turn tend to rotate the overrunning clutch driven part 23 clockwise so that faces D of the bridging member teeth 34 will be pressed lightly against opposed faces CC of the teeth 35 on driven part 23. This pressure between the teeth faces D and CC will necessarily be a light force because the overrunning clutch rollers 27 are not adapted to transmit force from the driven part 23 to the drive part 25 in the clockwise direction as viewed in Fig. 5.

If the bridging structure 32 is now slid endwise for meshing the teeth of the clutch 48, it will be impossible to obtain a wedging condition of these clutch teeth that would prevent or resist disengagement of the clutch. For instance, assuming that the clutch teeth 52 and 49 were in the circumferential relation illustrated in Fig. 5 at the time of meshing, subsequent demeshing could be facilitated by slightly speeding up the drive shaft which would cause the clutch driving member 25 to rotate clockwise relatively to the bridging structure 32 and relieve pressure between the tooth faces A and B. Such clockwise rotation of the driving part 25 relatively to the bridging structure 32 would be possible because of the backlash condition illustrated in Figs. 3 and 5, between the teeth or splines 35 and 34. That is, at the time the clutch 48 was engaged the faces CC and D of the splines 35 and 34 were engaged and faces H and G separated to permit the overrunning clutch driven part 23 to rotate clockwise as viewed in Fig. 5 relatively to the bridging structure 32. Therefore, the entire overrunning clutch unit would be free for clockwise rotation relatively to the bridging structure 32 to relieve pressure between teeth faces A—B and C—D.

Had the circumferential relationship of the overrunning clutch driving part 25 and the bridging structure 32 been such at the time the clutch 48 was engaged that the faces E and F of the teeth 49 and 52 were juxtaposed instead of the faces A and B, subsequent disengagement of the clutch could be facilitated by allowing the road wheels to slightly overrun the engine and thereby cause the gear hub 54 to rotate the bridging structure 32 clockwise relatively to the overruning driving part 25 for separating the teeth faces E and F while the driven part 23 of the overrunning clutch rotates clockwise relatively to the driving part as permitted by the clutch rollers 27. Should the clutch teeth 52 and 49 be in an intermediate position in a circumferential sense at the time of meshing thereof, that is, if these teeth should be between the extreme positions, in one of which the faces A and B slide upon one another and in the other of which the faces E and F slide upon one another, then subsequent demeshing of the clutch could be facilitated by either accelerating the engine to rotate the overrunning clutch driving part clockwise relatively to the bridging structure 32 or by permitting the road wheels of the vehicle to slightly overrun the engine so that the gear hub 54 would rotate the bridging structure slightly clockwise, as viewed in Fig. 5, as permitted by the overrunning clutch rollers.

If the operator of the apparatus should attempt to shift the bridging structure 32 for engaging the clutch 48 while power is being transmitted through the low speed power train, his action would be resisted by the gripping of the bridging member splines 34 between the splines 35 and 36. When power is being transmitted through the low speed power train, faces G and H of the splines 34 and 35 will be pressed together as well as faces D and DD of the splines 34 and 36. If sufficient load is being transmitted through the power train to incur a severe wedging relation between the faces A—B of the clutch teeth 52 and 49 and the faces G—H of the splines 34 and 35, should the clutch 48 be engaged while the faces A and B are in axial registry, the resistance to axial movement of the bridging structure by the pinching of the splines 34 between the splines 35 and 36 will be sufficient to preclude engagement of the clutch.

Considering the forward direction of the parts of this first embodiment, as illustrated in Fig. 5, to be in the clockwise direction, it can be ascertained that incident to shifting the bridging structure 32 for engaging the clutch 48, said bridging structure will be rotated to a clockwise limit with respect to the driven part 23. This is because of the tendency for the gear hub 54 to be rotating at a faster speed in the clockwise direction relatively to the driven part 23 while the overrunning clutch unit permits said hub 54 and said driven part 23 to rotate faster in the clockwise direction than the driving part 25. Consequently, the gear hub 54 can be regarded as means operable, while the clutch 48 is demeshed, for effecting limited rotation of the bridging structure 32 relatively to the driven part of the overrunning clutch in a forward direction.

In the second embodiment illustrated in Figs. 6 to 8 one or more leaf spring elements 61 is utilized in lieu of the gear hub 54 for effecting said limited rotation of the bridging structure in a clockwise direction relatively to a driven part 23' of an associated overrunning clutch unit 24' which corresponds to the unit 24 in the first embodiment. While only one of the spring elements 61 is shown in the drawings, any desired number of them may be employed.

Those parts of the apparatus illustrated in Figs. 6 to 8 which are identical with or correspond to respective parts illustrated in Figs. 1 to 5 are designated by the same respective characters with the addition of a prime. The principal difference in the two embodiments is that the second embodiment employs the aforesaid springs 61 and the hub of the overrunning clutch driven parts 23' is elongated so that it projects into and carries the gear 31'. The radically projecting spline elements 35' on this hub extension mesh with the radially projecting spline elements 34' of the bridging structure 32 as well as with splines 62 in the gear 31'. Snap rings 63 and 64 prevent axial displacement of the gear 31' on the hub of the overrunning clutch driven part.

Those of the ribs 35' having a spring element 61 in association therewith are separated into parts 35a and 35b by a transverse groove 65. An end 66 of each spline or rib part 35b is also cut back so that an end portion 67 of the associated spring 61 can extend transversely of the rib along such end without projecting beyond the corresponding ends of the other splines or ribs 35'. The opposite end portion, 68, of each spring 61 engages the opposite end, 69, of its associated rib portion 35b in a manner illustrated in Fig. 8. Rib portions 35b also are made thinner in a circumferential sense by cutting back the face bridged by the bowed part of their associated springs 61, so sufficient clearance will always prevail to avoid crushing or bending the spring beyond its elastic limit when there is a forceful tendency for the splines 35' to rotate the bridging structure 32' clockwise, as viewed in Fig. 7, when the jaw clutch 48' is closed.

Each spring 61 is subjected to internal stress causing it to bend to assume a more pronounced curvature than illustrated in Fig. 8 whereby the end portions 67 and 68 grip the ends of their associated rib portion 35b. While those portions of each spring element adjacently to its end portions bear against the end portions of its associated rib 35b, the bowed center part of each spring is caused to exert a force against the opposed face of the adjacent spline 34' and thereby urge the bridging structure 32' clockwise relatively to the overrunning clutch driven part 23' as viewed in Fig. 7.

As a consequence of the force exerted by the springs 61 between the meshed ribs or spline elements between which they are installed, the faces D' and C' respectively of the ribs 34' and 35' will be engaged when the bridging structure 32' is shifted for engaging the clutch 48'. If at the time of engaging the clutch 48' the circumferential positions of the bridging structure and of the overrunning clutch driving part 25' are as illustrated as in Fig. 7 so that the clutch tooth faces A' and B' are virtually axially aligned to slide against one another while the clutch is being meshed, the lock-out device cannot assume a condition in which great resistance is incurred in demeshing the clutch. This is because of the backlash condition then prevailing between the faces E' and F' of the teeth in the clutch 48' and also the backlash condition provided by the springs 61 between the rib faces G' and H'. Under these circumstances, the maximum pressure between the teeth faces A' and B' will be that exerted by the springs 61 and this will not be sufficient for causing difficult disengagement of the clutch. Even this pressure could be further diminished by accelerating the vehicle engine for rotating the overrunning clutch part 25' for separating the tooth faces A' and B'. On the other hand, if at the time of engaging the clutch 48', force was being transmitted through the overrunning clutch device so that the drive part 25' could not be subsequently rotated clockwise as viewed in Fig. 7 relatively to the driven part 32' when it was subsequently desired to demesh the clutch, the pressure between the tooth faces A' and B' would be limited to the combined forces of the springs 61 as explained above.

Should the overrunning clutch driving part 25' and the bridging structure 32' be in such a position of relative rotation at the time of clutch engagement that the tooth faces E' and F' were engaged, the spline rib faces C' and D' being engaged because of the force of the springs 61, diminution of the pressure between the tooth faces E' and F' could be expediently diminished by simply allowing the vehicle engine to decelerate and thereby allow the overrunning clutch driven part 23' and the bridging structure 32' to accelerate relatively to the overrunning clutch driving part 25', thereby separating the tooth faces E' and F' and simultaneously relieve all pressure between the spline rib faces C' and D' excepting that imposed thereon by the springs 61.

It can be ascertained from the above description of this second embodiment of the invention therefor that the clutch 48 can be demeshed easily irrespective of whether the bridging structure 32' occupies a circumferential position relatively to the overrunning clutch driving part 25' for engaging either the clutch tooth faces A' and B' or E' and F'. With neither sets of faces A' and B' or E' and F' pressed together there could, of course, be no difficulty in demeshing the clutch.

It is contemplated that the springs 61 can be mounted on teeth or ribs 34' instead of rib portions 35b. This modification is shown in Fig. 9 where one of the ribs 34'', which correspond to the ribs 34' in Figs. 6-8 and to the ribs 34 in Figs. 1-5, has its ends 66a and 69a cut back to receive the ends 67a and 68a of a spring having a bowed portion 61a reacting against the opposed face of an adjacent tooth 35''. In Fig. 9 those reference characters followed by a double prime or an alphabet letter respectively correspond to the parts in Fig. 8 designated by a reference character with a single prime or without a suffix. This construction is simpler since the groove 65 of Fig. 8 is eliminated. In Fig. 9 the rib face spanned by the bowed portion of the spring is cut back so corresponding faces on other ribs in the same series will abut against the respectively opposed faces on the ribs of the meshing series to transmit torsional force from the driven part of the overrunning clutch through the bridging structure and jaw clutch to the driving part of the jaw clutch in the clockwise direction as viewed in Fig. 7, while sufficient space is preserved between the cutback face and the rib face opposed thereto to avoid crushing or excessive distortion of the spring.

Having described a limited number of embodiments of the invention with the view of concisely and clearly illustrating the same, I claim:

1. In an overrunning power transmitting train, an overrunning clutch device including a rotatable driving part and a rotatable driven part coaxial with the driving part, a rotatable driven member coaxial with said driven part, and means for driving said driven member optionally from said parts comprising a bridging structure having meshed-element connections with said driven part and said driven member and adjustable axially of said parts and said elements incident to sliding the elements in said connections, and a dental clutch including components respectively constrained for rotation with the driving part and with said bridging structure and optionally meshable by the axial adjustment of said structure, and the connection between said structure and said driven part being constructed and arranged to provide for limited relative rotation of said structure and said driven part.

2. In an overrunning power transmitting train, a one-way torsional force transmitting device including coaxial relatively rotatable parts, a member rotatable coaxially of said parts, a bridging structure having splined connections with said member and with one of said parts and being adjustable axially thereof while said connections obtain, and a dental clutch including components respectively on said bridging structure and the other of said parts and optionally meshable by the axial adjustment of said structure, said clutch providing for substantial limited relative rotation between said structure and said other part while meshed, and the connection between said structure and the one part providing for substantial limited relative rotation therebetween.

3. In an overrunning power transmitting train, an overrunning clutch device including a rotatable driving part and a rotatable driven part coaxial with the driving part, a rotatable driven member coaxial with said driven part and having an end portion in adjacent end-to-end relation with an end portion of said driven part, said end portions being externally splined with the same number of spline ribs but with such ribs of the driven part portion having less circumferential breadth than those of said driven member portion, a bridging structure having internal splines of uniform circumferential breadth mutually meshed with the splines of said end portions and adjustable axially thereof while remaining so mutually meshed, said splines serving to transmit driving force between the driven parts and the driven member while the external splines grip the internal splines and thereby resist said axial adjustment of said bridging structure, and a jaw clutch including toothed counterparts on said structure and said driving part and adapted for optional engagement by selective axial adjustment of said structure, and the teeth of said clutch providing for substantial limited relative rotation of said driving part and structure while the toothed counterparts are meshed.

4. In an overrunning power transmitting train, an overruning clutch device including a rotatable driving part and a rotatable driven part coaxial with the driving part, a rotatable driven member coaxial with said driven part, and having an end portion in adjacent end-to-end relation with an end portion of said driven part, said end portions being externally splined with the same number of spline ribs but with such ribs of the driven part portion having less circumferential breadth than those of said driven member portion, a bridging structure having internal splines of uniform circumferential breadth mutually meshed with the splines of said end portions and adjustable axially thereof while remaining so mutually meshed, said splines serving to transmit driving force between the driven part and the driven member while the external splines grip the internal splines and thereby resist said axial adjustment of said bridging structure and means operable to establish a driving connection between said structure and said driving part incident to adjustment of said structure in one axial direction and to terminate such connection incident to adjustment of said structure in the opposite direction, and said driving connection establishing means being of a character to facilitate substantial limited relative rotation of said driving part and said structure driving the establishment of such connection.

5. In a lock-up mechanism for an overrunning clutch device which has coaxial relatively rotatable driving and driven parts and means to limit forward rotation of the driving part relatively to the driven part while facilitating retrograde rotation of the driving part relatively to the driven part, the combination of a bridging structure, meshed elements respectively constrained for rotation with said driven part and with said structure, said meshed elements being constructed and arranged to provide for axial adjustment of said structure relatively to said parts and for limited rotation of said structure relatively to the driven part, a dental clutch comprising components respectively constrained for rotation with said structure and said driving part and optionally meshable pursuant to axial adjustment of said structure, and means operable while said clutch is demeshed for effecting the limited rotation of said structure relatively to said driven part in a forward direction.

6. In the lock-up mechanism for an overrunning clutch device which has coaxial relatively rotatable driving and driven parts and means to limit forward rotation of the driving part relatively to the driven part while facilitating forward rotation of the driven part relatively to the drive part, the combination of a bridging structure, meshed elements respectively constrained for rotation with said driven part and with said structure, said meshed elements being constructed and arranged to provide for axial adjustment of said structure relatively to said parts and for limited rotation of said structure relatively to the driven part, means yieldably urging said structure rotatively forwardly relatively to said driven part, and means operable to establish a driving connection between said structure and said driving part incident to adjustment of said structure in one axial direction and to terminate such connection incident to adjustment of said structure in the opposite direction, and said driving connection establishing means being of a character to facilitate substantial limited relative rotation of said driving part and said structure during the establishment of such connection.

7. In a lock-up mechanism for an overrunning clutch device which has coaxial relatively rotatable driving and driven parts and means to limit forward rotation of the driving part relatively to the driven part while facilitating forward rotation of the driven part relatively to the drive part, said driven part having a splined portion, a bridging structure having a splined portion of which the spline ribs are meshed with those of the driven part splined portion, the spaces between the ribs of at least one of said splined portions having greater breadth than such ribs to facilitate limited relative rotation of said structure and driven part, spring means between certain of the meshed spline ribs and reacting therebetween to urge said structure rotatively forwardly relatively to the driven structure, and means operable to establish a driving connection between said structure and said driving part incident to adjustment of said structure in one axial direction and to terminate such connection incident to adjustment of said structure in the opposite direction, and said driving connection establishing means being of a character to facilitate substantial limited relative rotation of said driving part and said structure during the establishment of such connection.

8. The combination set forth in claim 7, wherein said spring means comprises an elongated bowed spring member extending lengthwise of and between opposed faces of adjacent ribs having end sections projecting transversely of one of said adjacent ribs at its ends.

9. In a lock-up mechanism for an overrunning clutch device having coaxial driving and driven parts of which the latter is rotatable forwardly relatively to the former and of which parts the driven part has a series of spline ribs extending axially thereof, a bridging structure having a series of spline ribs meshed with those of the driven part, the ribs in one of said series being of less width linearly of the pitch line of such series than the corresponding width of the spaces between the ribs of the other series to facilitate limited relative rotation of said structure and said driven part, spring means between a face on certain of the ribs in one series and the opposed face on adjacent ribs of the other series for urging the structure to rotate forwardly relatively to the driven part, a jaw clutch means adapted to connect said structure with said driving part in a manner adapting limited relative rotation between the structure and said driving part, and at least one of the opposed rib faces being cut back to remain spaced apart and avoid excessive gripping of the spring therebetween while corresponding faces of other teeth in the two series abut together for transmitting torsional force forwardly from the driven part through said structure and said clutch to the driving part.

OSCAR H. BANKER.